E. T. & E. M. SHERMAN.
DIRECTION SIGNAL FOR AUTOMOBILES.
APPLICATION FILED JULY 14, 1917.

1,265,822.

Patented May 14, 1918.
2 SHEETS—SHEET 1.

WITNESSES
E. E. Wells
Eva E. Konig

INVENTORS
Edward T. Sherman
Elizabeth M. Sherman
BY THEIR ATTORNEYS
Williamson Merchant

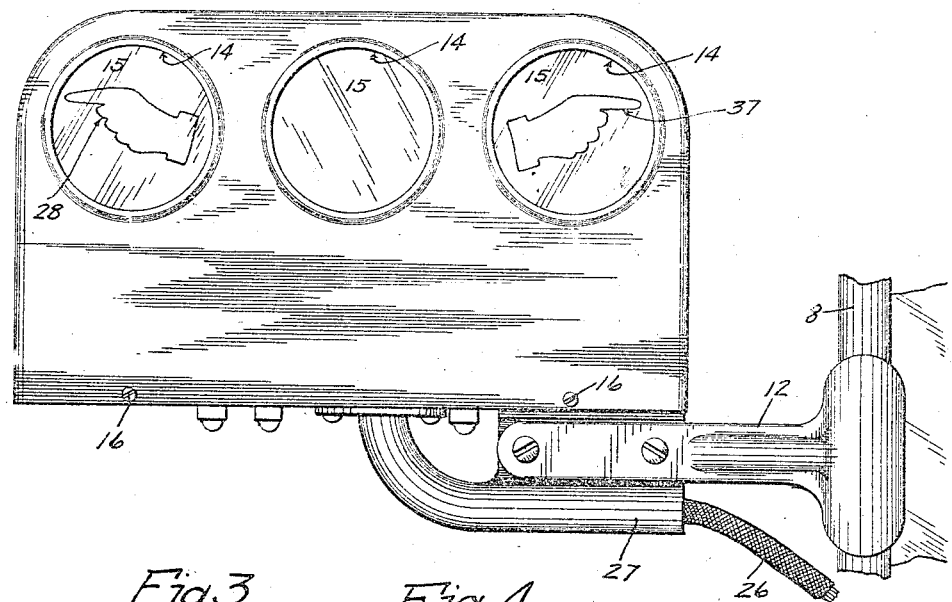
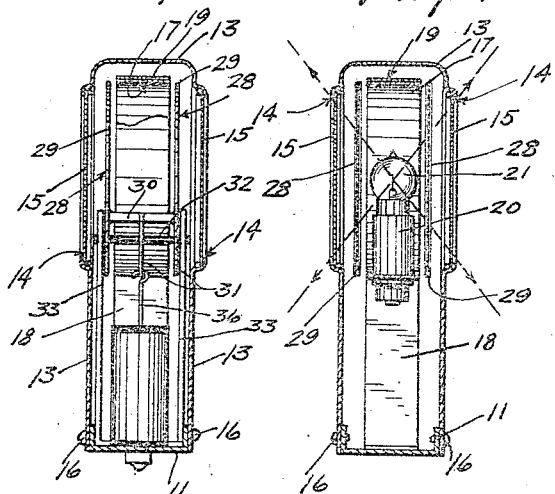
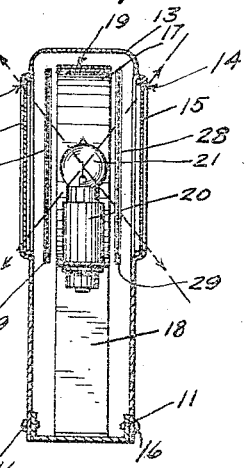
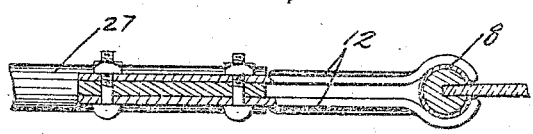

UNITED STATES PATENT OFFICE.

EDWARD T. SHERMAN AND ELIZABETH M. SHERMAN, OF MINNEAPOLIS, MINNESOTA.

DIRECTION-SIGNAL FOR AUTOMOBILES.

1,265,882.  Specification of Letters Patent.  Patented May 14, 1918.

Application filed July 14, 1917. Serial No. 180,689.

*To all whom it may concern:*

Be it known that we, EDWARD T. SHERMAN and ELIZABETH M. SHERMAN, citizens of the United States, residing at Minneapolis, in the county of Hennepin and State of Minnesota, have invented certain new and useful Improvements in Direction-Signals for Automobiles; and we do hereby declare the following to be a full, clear, and exact description of the invention, such as will enable others skilled in the art to which it appertains to make and use the same.

Our invention relates to improvements in direction signaling apparatus intended for general use, but especially adapted for use in connection with motor-driven vehicles; and, to this end, generally stated, the invention consists of the novel devices and combinations of devices hereinafter described and defined in the claims.

By the use of the invention, the driver of a vehicle may give signals indicating the direction in which he is about to turn the vehicle, or whether the vehicle will proceed straight ahead, move backward, or stop. All of these different signals are given, as shown, by the use of green, white and red color plates that are movable from hidden positions to positions in which they are plainly visible, both from the front and rear of the vehicle. The green signal indicates that the machine is about to be turned at a right angle to the right, and the white signal indicates that the vehicle will proceed straight ahead, while the red signal indicates that the vehicle is about to be turned at a right angle to the left. By combining the green and white signals, they will indicate that the vehicle is about to be turned in a semi-circle to the right, and by combining the red and white signals, they will indicate that the vehicle is about to be turned in a semi-circle to the left. The combination of the red and green signals indicates that the vehicle is to be moved backward, and the combination of the red, white and green signals indicates that the vehicle is to come to a stop.

These movable signals are preferably electrically operated and, as shown in the drawings, are in the form of color plates connected in laterally spaced pairs arranged to be moved from hidden positions in a casing in which they are mounted to positions back of axially alined pairs of light openings, formed in the front and rear walls of said casing, and closed by panes of transparent material, preferably clear celluloid. Between each pair of light openings, is a light chamber in which is located an incandescent lamp, that is in the same circuit as the electromagnetic devices, which serve to independently operate the respective pair of color plates. These light chambers are spaced apart from the light openings to afford passageways into which the color plates move, when operated to give a signal. As these passageways are located between the light chambers and opposite pairs of light openings, the incandescent lamp will illuminate the color plates of each pair, when moved into said passageways.

The circuit for each pair of color plates and the respective incandescent lamp is normally open and may be closed, at will, by a push-button switch, thus making it possible to independently operate any one pair of color plates or any desired combination thereof. The push-button switches, as shown, are located on the steering post, but may be located in any other suitable place within easy reach of the driver. When the push-button switches are released to break the circuits, the color plates return to hidden positions, under the action of gravity.

In the accompanying drawings, which illustrate the invention, like characters indicate like parts throughout the several views.

Referring to the drawings,

Fig. 3 is a transverse vertical section taken on the line 3—3 of Fig. 2;

Fig. 4 is a transverse vertical section taken on the line 4—4 of Fig. 2;

Fig. 5 is a detail view, principally in section taken on the irregular line 5—5 of Fig. 2; and Fig. 6 is a rear elevation of the apparatus illustrating a slight modification thereof.

Figure 1:
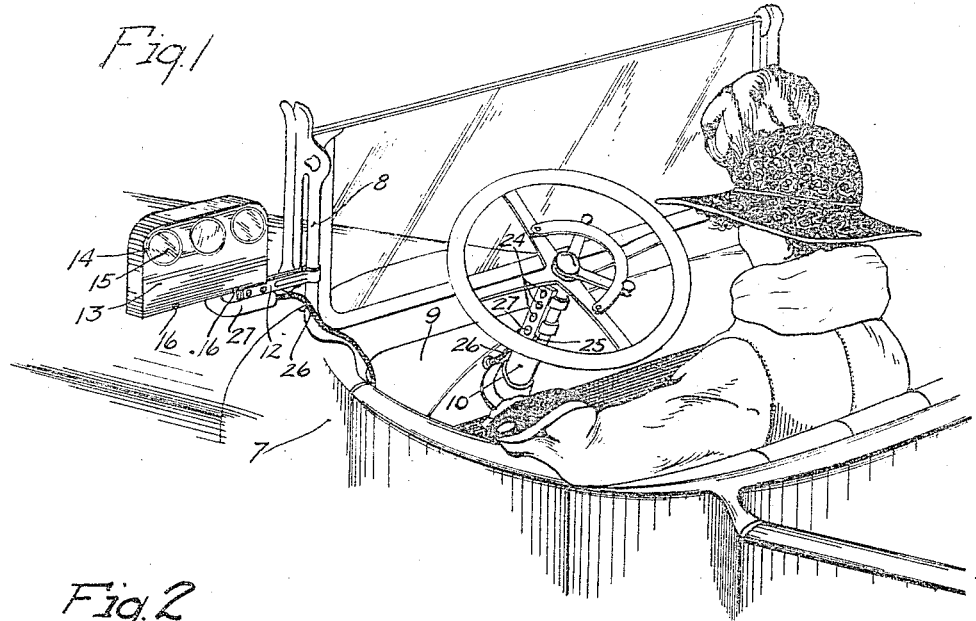
Figure 1 is a fragmentary perspective view of an automobile having the invention attached thereto.

For the purpose of showing the invention applied in working position, there is illustrated in the drawings an automobile, indicated as an entirety by the numeral 7, with the exception of the wind shield 8, dash 9, and steering post 10.

Referring now to the invention, the numeral 11 indicates a pan-like base plate having a two-part clamping bracket 12, especially designed to be clamped onto the frame of the wind shield 8 and support said base plate therefrom to one side of the automobile, preferably to the left, as shown. It is, of course, understood that the apparatus may be attached in any other suitable place. Fitted onto the marginal flange of the base plate 11, is a casing 13 having in its sides three horizontally spaced pairs of annular light openings 14, that are closed by transparent panes 15, preferably of clear celluloid, but which may be of glass or other suitable material. The casing 13 is detachably secured to the flange of the base plate 11 by screws 16.

Axially alined with each pair of light openings 14, is a tubular light chamber 17, the ends of which are open and terminate short of the side of the casing 13, so that there is a passageway between each end of each light chamber and the respective light opening 14. The end light chambers 17 are supported from the base plate 11 on skeleton brackets 18 and the intermediate light chamber 17 is supported from the end ones by bars 19.

In the bottom of each light chamber 17, is a lamp socket 20, in which is mounted an incandescent lamp 21. Lead wires 22 connect the contacts of each lamp 21 with a battery 23, or other suitable source of electrical energy. The circuit between each lamp 21 and the battery 23 is normally open and may be closed, at will, by a push-button switch 24. These push-button switches 24 are mounted in a switch casing 25 and the wires 22 are incased in a flexible tubing 26. The tubing 26, at the casing 13, is mounted in a conduit 27, integrally formed with the fixed member of the clamping bracket 12 and rigidly secured to the base plate 11, at a point where the conduit 27 enters the casing 13. As shown, the casing 25 is attached to the steering post 10, but may be secured in any other place within easy reach of the driver. The conduit 26, at the tubing 25, is extended through an aperture in the dash 9. Also mounted in the casing 25, is a push-button 27 for a horn or other audible signal, not shown.

Figure 2:
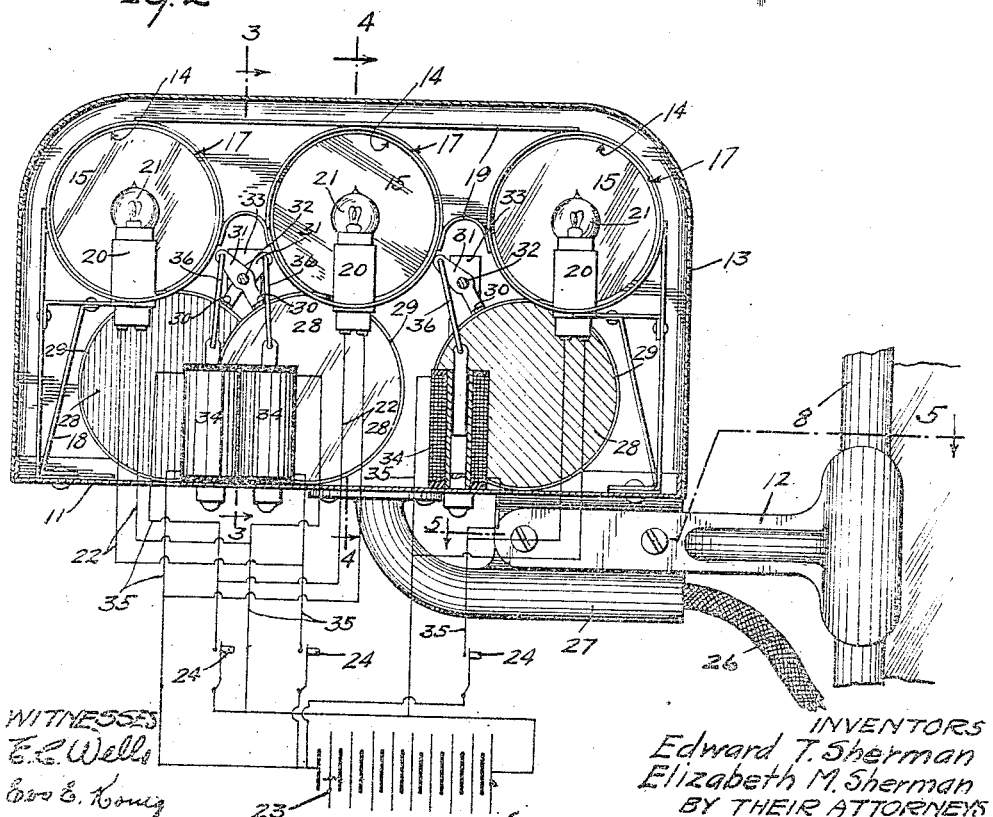
Fig. 2 is a view, principally in vertical section, taken longitudinally through the apparatus and diagrammatically showing the wiring therefor.

Movable signals, in the form of color plates or disks 28, are arranged to be moved from normally hidden positions in the casing 13 to positions between the light chambers 17 and the light openings 14, so that the light from the lamp 21 will shine therethrough and produce a signal that is visible from both the front and rear of the automobile 7. The color plates 28 are preferably made from celluloid and mounted in frames 29 of like or other suitable material. The two color plates 28, for each light chamber 17, are rigidly connected in axial alinement by a tie bar 30, attached to the frames 29 thereof. These tie bars 30 hold coöperating pairs of color plates 28 laterally spaced, so that they may be moved into the passageways, between each light chamber 17 and the respective light opening 14, thus positioning the color plates 28, with the lamps 21 therebetween, so that the light therefrom will be directed through the pairs of said color plates, thereby making it possible to see a signal, both from the front and rear of the automobile. By reference to Fig. 2, it will be noted that the three pairs of color plates 28 are red, white and green, reading from the left to the right, respectively.

Rigidly secured to the tie bar 30, connecting each pair of color plates 28, is a radial arm 31 intermediately pivoted on short transverse shafts 32, secured in standards 33 on the base plates 11, and it will be noted that the arms 31 of the red and white color plates 28 are pivoted on the same shaft. These arms 31 are so pivoted that the color plates 28 will move, under the action of gravity, on arcs from positions between the light chambers 17 and light openings 14 to hidden positions therebelow.

The pairs of color plates 28 are independently raised from their hidden positions to positions between the light chambers 17 and light openings 14 by solenoids 34, connected by wires 35 in the same circuit as the respective lamp 21. Links 36 connect the free ends of the arms 31 with the movable cores of the solenoids 34. Obviously, when one of the push-buttons 24 is pressed, the respective circuit will be closed, thereby energizing the solenoid and the downward movement of its core will lift the connected pair of color plates 28 into exposed positions, and, at the same time, the current will pass through the lamp 21, and said color plates illuminated thereby.

It is, of course, evident that not only the driver but other occupants of the automobile may operate the push-buttons 24, to give a visual signal, and the push-button 27 for a horn or other audible alarm may be simultaneously operated with the push-buttons 24.

In Fig. 6, index hands 37 are painted or otherwise indicated on the green and red color plates 15 for coöperation therewith to indicate more clearly, in case a person is not entirely familiar with the code of signals, the direction in which the vehicle is about to be turned. As previously stated, the green signal indicates that the vehicle is to be turned to the right and the red signal indicates that the vehicle is to be turned to the left, and it will be noted that the index hands are so positioned that they point in like directions.

What we claim is:—
1. A signaling device comprising a base plate having a clamping bracket, a casing supported on the base plate, said casing having in its sides opposite pairs of light openings, horizontal tubular light chambers axially alined with the pairs of light openings and having their open ends spaced apart from the sides of said casing, laterally spaced pairs of translucent color plates mounted for movement from hidden positions into position between the light chambers and light openings, and means for moving the color plates from their hidden positions.

2. A signaling device comprising a casing having in its sides opposite pairs of light openings, a light casing between each pair of light openings, a lamp for each light chamber, laterally spaced pairs of translucent color plates movable from hidden positions into positions between the light openings and lamps, and means for moving the color plates from their hidden positions.

In testimony whereof we affix our signatures in presence of two witnesses.

EDWARD T. SHERMAN.
ELIZABETH M. SHERMAN.

Witnesses:
HELEN M. KELLY,
MELL R. EDWARDS.